US012288081B2

(12) United States Patent
Simpson et al.

(10) Patent No.: US 12,288,081 B2
(45) Date of Patent: *Apr. 29, 2025

(54) RUNNING A LEGACY APPLICATION ON A NON-LEGACY DEVICE WITH APPLICATION-SPECIFIC OPERATING PARAMETERS FOR BACKWARDS COMPATIBILITY

(71) Applicant: Sony Interactive Entertainment Inc., Tokyo (JP)

(72) Inventors: David Simpson, Los Angeles, CA (US); Mark Evan Cerny, Burbank, MA (US)

(73) Assignee: Sony Interactive Entertainment Inc., Tokyo (JP)

(*) Notice: Subject to any disclaimer, the term of this patent is extended or adjusted under 35 U.S.C. 154(b) by 250 days.

This patent is subject to a terminal disclaimer.

(21) Appl. No.: 17/903,763

(22) Filed: Sep. 6, 2022

(65) Prior Publication Data

US 2023/0004405 A1   Jan. 5, 2023

Related U.S. Application Data

(63) Continuation of application No. 17/170,692, filed on Feb. 8, 2021, now Pat. No. 11,474,833, which is a
(Continued)

(51) Int. Cl.
*G06F 8/76* (2018.01)
*G06F 9/445* (2018.01)
*G06F 11/34* (2006.01)

(52) U.S. Cl.
CPC ...... *G06F 9/44505* (2013.01); *G06F 11/3419* (2013.01); *G06F 11/3442* (2013.01);
(Continued)

(58) Field of Classification Search
None
See application file for complete search history.

(56) References Cited

U.S. PATENT DOCUMENTS 5,805,792 A * 9/1998 Swoboda ....... G01R 31/318536
714/E11.215
6,006,310 A   12/1999 Klein
(Continued)

FOREIGN PATENT DOCUMENTS

CN   1716203 A   1/2006
CN   1797344 A   7/2006
(Continued)

OTHER PUBLICATIONS

Final Office Action for U.S. Appl. No. 17/852,821, dated Jun. 29, 2023.
(Continued)

*Primary Examiner* — Philip Wang
*Assistant Examiner* — Rongfa P Wang
(74) *Attorney, Agent, or Firm* — Kilpatrick Townsend & Stockton LLP

(57) ABSTRACT

A method, system and computer readable medium for running a legacy application on a non-legacy device. Operating parameters of the non-legacy device when running the legacy application are set based on one or more pre-determined heuristics for adjustment of operating parameters of the newer system when running the legacy application on the non-legacy device from one or more performance metrics and other performance information.

20 Claims, 5 Drawing Sheets

Related U.S. Application Data continuation of application No. 16/408,054, filed on May 9, 2019, now Pat. No. 10,915,333, which is a continuation of application No. 15/466,769, filed on Mar. 22, 2017, now Pat. No. 10,303,488.

(60) Provisional application No. 62/315,345, filed on Mar. 30, 2016.

(52) U.S. Cl.
CPC ............ *G06F 11/3452* (2013.01); *G06F 8/76* (2013.01); *G06F 2201/88* (2013.01)

(56) References Cited

U.S. PATENT DOCUMENTS

| | | | |
|---|---|---|---|
| 6,526,463 B1 | 2/2003 | Ding et al. | |
| 6,651,156 B1 | 11/2003 | Courtright et al. | |
| 6,671,791 B1 | 12/2003 | McGrath | |
| 7,036,008 B2 | 4/2006 | Raghavachari et al. | |
| 7,171,543 B1 | 1/2007 | Ronen et al. | |
| 7,685,593 B2 | 3/2010 | Solomon et al. | |
| 7,757,214 B1* | 7/2010 | Palczak | G06F 9/5083 717/121 |
| 8,274,518 B2 | 9/2012 | Blythe | |
| 8,423,976 B2 | 4/2013 | Zwirner et al. | |
| 8,782,645 B2 | 7/2014 | Breternitz et al. | |
| 8,832,679 B2 | 9/2014 | Suchy et al. | |
| 8,881,139 B1* | 11/2014 | Acacio | G06F 8/76 717/177 |
| 9,495,790 B2 | 11/2016 | Cerny | |
| 9,652,882 B2 | 5/2017 | Cerny | |
| 10,120,663 B2 | 11/2018 | Hasabnis et al. | |
| 10,235,219 B2* | 3/2019 | Cerny | G06F 9/541 |
| 10,275,239 B2 | 4/2019 | Simpson et al. | |
| 2001/0033287 A1 | 10/2001 | Naegle et al. | |
| 2003/0217280 A1* | 11/2003 | Keaton | G06F 21/14 713/193 |
| 2004/0003211 A1 | 1/2004 | Damron | |
| 2004/0059887 A1 | 3/2004 | Venkatraman | |
| 2005/0015569 A1 | 1/2005 | So et al. | |
| 2005/0033831 A1 | 2/2005 | Rashid | |
| 2005/0123032 A1 | 6/2005 | Chen | |
| 2005/0154915 A1 | 7/2005 | Peterson et al. | |
| 2006/0005200 A1* | 1/2006 | Vega | G06F 12/10 718/108 |
| 2006/0010450 A1 | 1/2006 | Culter | |
| 2006/0046819 A1* | 3/2006 | Nguyen | G07F 17/323 463/16 |
| 2006/0069534 A1* | 3/2006 | Kinney | G06F 9/45533 703/1 |
| 2006/0146057 A1 | 7/2006 | Blythe | |
| 2006/0281556 A1 | 12/2006 | Solomon et al. | |
| 2007/0016895 A1 | 1/2007 | Tan | |
| 2007/0050594 A1 | 3/2007 | Augsburg et al. | |
| 2007/0061634 A1 | 3/2007 | Marisetty et al. | |
| 2007/0156391 A1* | 7/2007 | Guenthner | G06F 9/455 703/27 |
| 2007/0198982 A1 | 8/2007 | Bolan et al. | |
| 2007/0271560 A1 | 11/2007 | Wahlert et al. | |
| 2007/0283324 A1* | 12/2007 | Geisinger | G06F 9/455 717/120 |
| 2008/0010408 A1 | 1/2008 | Shen et al. | |
| 2008/0141131 A1* | 6/2008 | Cerny | G06F 3/048 345/545 |
| 2008/0141279 A1 | 6/2008 | Mattson et al. | |
| 2008/0172524 A1 | 7/2008 | Singh et al. | |
| 2009/0164766 A1 | 6/2009 | Suggs et al. | |
| 2010/0095097 A1 | 4/2010 | Gschwind | |
| 2010/0218029 A1 | 8/2010 | Floyd et al. | |
| 2011/0103494 A1 | 5/2011 | Ahmadi | |
| 2011/0292161 A1 | 12/2011 | Sharon et al. | |
| 2012/0033673 A1 | 2/2012 | Goel | |
| 2012/0124347 A1 | 5/2012 | Dundas et al. | |
| 2012/0142425 A1* | 6/2012 | Scott | G07F 17/3227 463/42 |
| 2012/0167121 A1* | 6/2012 | Reierson | G06F 9/468 707/803 |
| 2013/0339649 A1 | 12/2013 | Hsu et al. | |
| 2014/0004949 A1* | 1/2014 | Miura | A63F 13/30 463/37 |
| 2014/0007097 A1 | 1/2014 | Chin et al. | |
| 2014/0082625 A1 | 3/2014 | Busaba et al. | |
| 2014/0181487 A1 | 6/2014 | Sasanka | |
| 2014/0282425 A1 | 9/2014 | Zhao et al. | |
| 2015/0280979 A1 | 10/2015 | Pesonen | |
| 2015/0287158 A1 | 10/2015 | Cerny et al. | |
| 2015/0287165 A1 | 10/2015 | Berghoff | |
| 2015/0287166 A1 | 10/2015 | Cerny | |
| 2015/0287167 A1 | 10/2015 | Cerny | |
| 2015/0287230 A1 | 10/2015 | Cerny | |
| 2015/0287231 A1 | 10/2015 | Berghoff | |
| 2015/0287232 A1 | 10/2015 | Cerny | |
| 2015/0287239 A1 | 10/2015 | Berghoff | |
| 2015/0358810 A1* | 12/2015 | Chao | H04W 4/50 455/418 |
| 2016/0092677 A1 | 3/2016 | Patel et al. | |
| 2016/0170405 A1* | 6/2016 | Cargnelli | G05B 19/418 700/40 |
| 2016/0210173 A1 | 7/2016 | Bookman et al. | |
| 2016/0246323 A1* | 8/2016 | Cerny | G06F 1/08 |
| 2016/0246652 A1 | 8/2016 | Herdrich et al. | |
| 2017/0001732 A1 | 1/2017 | Lim | |
| 2017/0003984 A1 | 1/2017 | Gatson et al. | |
| 2017/0031732 A1* | 2/2017 | Cerny | G06F 9/46 |
| 2017/0031834 A1* | 2/2017 | Cerny | G06F 12/1027 |
| 2017/0052780 A1* | 2/2017 | Clevenger | G06F 8/36 |
| 2017/0061671 A1 | 3/2017 | Cerny | |
| 2017/0123961 A1* | 5/2017 | Cerny | G06F 9/46 |
| 2017/0124760 A1 | 5/2017 | Murakawa et al. | |
| 2017/0192796 A1* | 7/2017 | Kunjuraman | G06F 9/44505 |
| 2017/0228225 A1* | 8/2017 | Rachlin | G06F 8/52 |
| 2017/0286282 A1* | 10/2017 | Simpson | G06F 11/3419 |
| 2018/0349109 A1* | 12/2018 | Brown | G06N 20/00 |
| 2019/0265984 A1 | 8/2019 | Simpson et al. | |
| 2020/0380415 A1* | 12/2020 | Siracusa | G06F 8/35 |
| 2022/0223055 A1* | 7/2022 | Donhoffner | B64D 43/00 |
| 2022/0224540 A1* | 7/2022 | Chaudhry | G06F 21/64 |

FOREIGN PATENT DOCUMENTS

| | | |
|---|---|---|
| CN | 102270291 A | 12/2011 |
| CN | 103562870 A | 2/2014 |
| EP | 0260568 A2 | 3/1988 |
| EP | 2924564 A1 | 9/2015 |
| JP | S63146128 A | 6/1988 |
| JP | 649528 A | 1/1989 |
| JP | 2008513913 A | 5/2008 |
| JP | 2008139964 A | 6/2008 |
| JP | 2014182813 A | 9/2014 |
| KR | 101220072 B1 | 1/2013 |

OTHER PUBLICATIONS

Non-Final Office Action for U.S. Appl. No. 17/852,821, dated Feb. 28, 2023.

Japanese Office Action for Japanese Application No. 2023-002896, dated Jan. 9, 2024.

Co-Pending U.S. Appl. No. 62/315,315, to David Simpson and Mark Cerny, filed Mar. 30, 2016.

Co-Pending U.S. Appl. No. 62/315,345, to Mark Cerny and David Simpson, filed Mar. 30, 2016.

Extended European Search Report dated Jan. 2, 2020 for Application EP17776336.4.

Extended European Search Report dated Oct. 31, 2019 for Patent Application Number 17776335.6.

Final Office Action for U.S. Appl. No. 14/810,334, dated Mar. 12, 2018.

Final Office Action for U.S. Appl. No. 14/810,361, dated Dec. 11, 2019.

(56) References Cited

OTHER PUBLICATIONS

Final Office Action for U.S. Appl. No. 14/810,361, dated Dec. 28, 2018.
Final Office Action for U.S. Appl. No. 14/810,361, dated July Jun. 2021.
Final Office Action for U.S. Appl. No. 14/810,361, dated Nov. 6, 2020.
Final Office Action for U.S. Appl. No. 14/810,361, dated Oct. 20, 2017.
Final Office Action for U.S. Appl. No. 15/466,759, dated Oct. 26, 2018.
Final Office Action for U.S. Appl. No. 14/810,334, dated May 31, 2017.
International Search Report dated Jun. 1, 2017 for International Patent Application No. PCT/US2017/023771.
Japanese Office Action for JP Application No. 2021-018039, dated Mar. 1, 2022.
Non-Final Office Action for U.S. Appl. No. 14/810,361, dated Dec. 9, 2021.
Non-Final Office Action for U.S. Appl. No. 14/810,361, dated Jul. 23, 2019.
Non-Final Office Action for U.S. Appl. No. 14/810,361, dated Jul. 8, 2020.
Non-Final Office Action for U.S. Appl. No. 14/810,361, dated Jun. 2, 2017.
Non-Final Office Action for U.S. Appl. No. 14/810,361, dated Mar. 28, 2018.
Non-Final Office Action for U.S. Appl. No. 14/810,361, dated Mar. 4, 2021.
Non-Final Office Action for U.S. Appl. No. 15/466,759, dated Aug. 9, 2018.
Non-Final/Final Office Action for U.S. Appl. No. 14/810,334, dated Sep. 12, 2017.
Non-Final/Final Office Action for U.S. Appl. No. 16/408,054, dated May 13, 2020.
Notice of Allowance for U.S. Appl. No. 14/810,334, dated Oct. 31, 2018.
Notice of Allowance for U.S. Appl. No. 14/810,361, dated Mar. 25, 2022.
Notice of Allowance for U.S. Appl. No. 15/466,759, dated Dec. 12, 2018.
Notice of Allowance for U.S. Appl. No. 15/466,769, dated Jan. 17, 2019.
Notice of Allowance for U.S. Appl. No. 16/408,054, dated Sep. 18, 2020.
Notice of Allowance for U.S. Appl. No. 17/170,692, dated Jun. 23, 2022.
Office Action dated Feb. 3, 2020 for Chinese Patent Application No. 201610577282.0.
Office Action dated Apr. 14, 2020 for Korean patent application No. 2020-7007454.
Office Action dated Jan. 29, 2021 for Korean Patent Application 10-2020-7031882.
Office Action dated Jun. 6, 2018 for Taiwan Patent Application No. 105120792.
Office Action dated May 14, 2019 for Chinese Patent Application No. 201610577282.0.
Office Action dated Oct. 12, 2020 for Chinese Patent Application No. 201610577282.0.
Notice of Allowance for U.S. Appl. No. 17/852,821, dated Nov. 6, 2023.

* cited by examiner ical advances in busses, clock speed, processor architecture, caching, standards, etc. When one computer architecture is replaced by a newer architecture the older architecture becomes what is called legacy architecture. Over the course of its development software applications, such as network protocols, user interfaces, audio processing, device drivers, graphics processing, messaging, word processors, spreadsheets, database programs, games, and other applications are written for a legacy architecture. Such legacy software still has value to its users even if they upgrade to a new architecture. A need therefore exists to be able to run legacy software on the new architecture.

RUNNING A LEGACY APPLICATION ON A NON-LEGACY DEVICE WITH APPLICATION-SPECIFIC OPERATING PARAMETERS FOR BACKWARDS COMPATIBILITY

CLAIM OF PRIORITY

This application is a continuation of U.S. patent application Ser. No. 17/170,692 to David Simpson and Mark Evan Cerny entitled "DERIVING APPLICATION-SPECIFIC OPERATING PARAMETERS FOR BACKWARDS COMPATIBILITY", filed Feb. 8, 2021, the entire contents of which are incorporated herein by reference.

U.S. patent application Ser. No. 17/170,692 is a continuation of U.S. patent application Ser. No. 16/408,054 to David Simpson and Mark Evan Cerny entitled "DERIVING APPLICATION-SPECIFIC OPERATING PARAMETERS FOR BACKWARDS COMPATIBILITY", filed May 9, 2019, the entire contents of which are incorporated herein by reference.

U.S. patent application Ser. No. 16/408,054 is a continuation of U.S. patent application Ser. No. 15/466,769 to David Simpson and Mark Evan Cerny entitled "REAL TIME ADJUSTMENT OF APPLICATION-SPECIFIC OPERATING PARAMETERS FOR BACKWARDS COMPATIBILITY", filed Mar. 22, 2017, the entire contents of which are incorporated herein by reference.

U.S. patent application Ser. No. 15/466,769 claims the benefit of U.S. Provisional Patent Application No. 62/315,345 filed Mar. 30, 2016, the entire contents of which are incorporated herein by reference.

CROSS-REFERENCE TO RELATED APPLICATION

This application is related to U.S. Provisional Patent Application No. 62/315,315 to Mark Evan Cerny and David Simpson entitled "DERIVING APPLICATION-SPECIFIC OPERATING PARAMETERS FOR BACKWARDS COMPATIBILITY", filed Mar. 30, 2016, the entire contents of which are incorporated herein by reference.

This application is related to U.S. patent application Ser. No. 15/466,759 to David Simpson and Mark Evan Cerny entitled "DERIVING APPLICATION-SPECIFIC OPERATING PARAMETERS FOR BACKWARDS COMPATIBILITY", filed Mar. 22, 2017 (now U.S. Pat. No. 10,275,239 issued Apr. 30, 2019, the entire contents of which are incorporated herein by reference.

FIELD OF THE DISCLOSURE

Aspects of the present disclosure are related to execution of a computer application on a computer system. In particular, aspects of the present disclosure are related to a system or a method that provides backward compatibility for applications/titles designed for older versions of a computer system.

BACKGROUND

When new computer architecture is released it is desirable for the applications written for a previous version of the architecture to run flawlessly on the new architecture. This capability is often referred to as "backwards compatibility." Implementing backwards compatibility involves emulating a target legacy device on the new host architecture so that the new architecture can execute the instructions of programs written for the legacy device. Computer architectures change over time to take advantage of technological advances in busses, clock speed, processor architecture, caching, standards, etc. When one computer architecture is replaced by a newer architecture the older architecture becomes what is called legacy architecture. Over the course of its development software applications, such as network protocols, user interfaces, audio processing, device drivers, graphics processing, messaging, word processors, spreadsheets, database programs, games, and other applications are written for a legacy architecture. Such legacy software still has value to its users even if they upgrade to a new architecture. A need therefore exists to be able to run legacy software on the new architecture.

Differences in performance of the hardware components of a new device and a legacy device can cause errors in synchronization on the new device, which may cause a legacy application to crash or produce incorrect output when running on a new device architecture. Such differences in performance can arise, e.g., from differences in hardware architecture between the new and legacy devices. It is within this context that aspects of the present disclosure arise.

INTRODUCTION

To address problems that arise due to differences in hardware behavior when running a legacy application on a new device the new hardware may be tuned to run the legacy application.

During a testing stage the legacy application is run on a legacy device with legacy architecture and performance information is collected. Examples of performance information include the number of ALU instructions or memory operations per unit time, and average parallel processing hardware scheduling unit (e.g., wavefront) occupancy or lifetime. The performance information may be directly measured (ALU and memory operations) by running games and application on a legacy device and reading counters. Alternatively, performance information may be derived from reading such counters or other data output as part of the measuring process. As an example of such derivation, average wavefront occupancy and lifetime may be derived from measurements of when wavefronts start and stop. Combined performance data for a particular application, e.g., a particular video game, is referred to herein as the performance characteristics for that application. The performance characteristics determined for the application in the testing stage can be used as a baseline for running the same application on a new system to ensure backwards compatibility.

The performance of an application on a new device may be closely matched to the performance of that same application on the legacy device by tuning the operating parameters of the new device. Examples of operating parameters include, among other things, the clock frequencies of the new device, the number of available general purpose registers (GPRs), instruction launch rates, and the like. The application may be run repeatedly on the new system while tuning its operating parameters to adjust the application-specific performance characteristics. After a sufficient number of tests on the new system one can analyze how the performance characteristics of the application on the new system converge as the operating parameters change. A new set of operating parameters can be created based on the convergence analysis. This process may be repeated until the operating parameters are set optimally for the application on the new system. To further optimize, one can adjust the execution of the new hardware to see if the application can be run faster on the new hardware without causing it to fail.

DETAILED DESCRIPTION

Application-Specific Performance Characteristic Determination

Figure 1A:
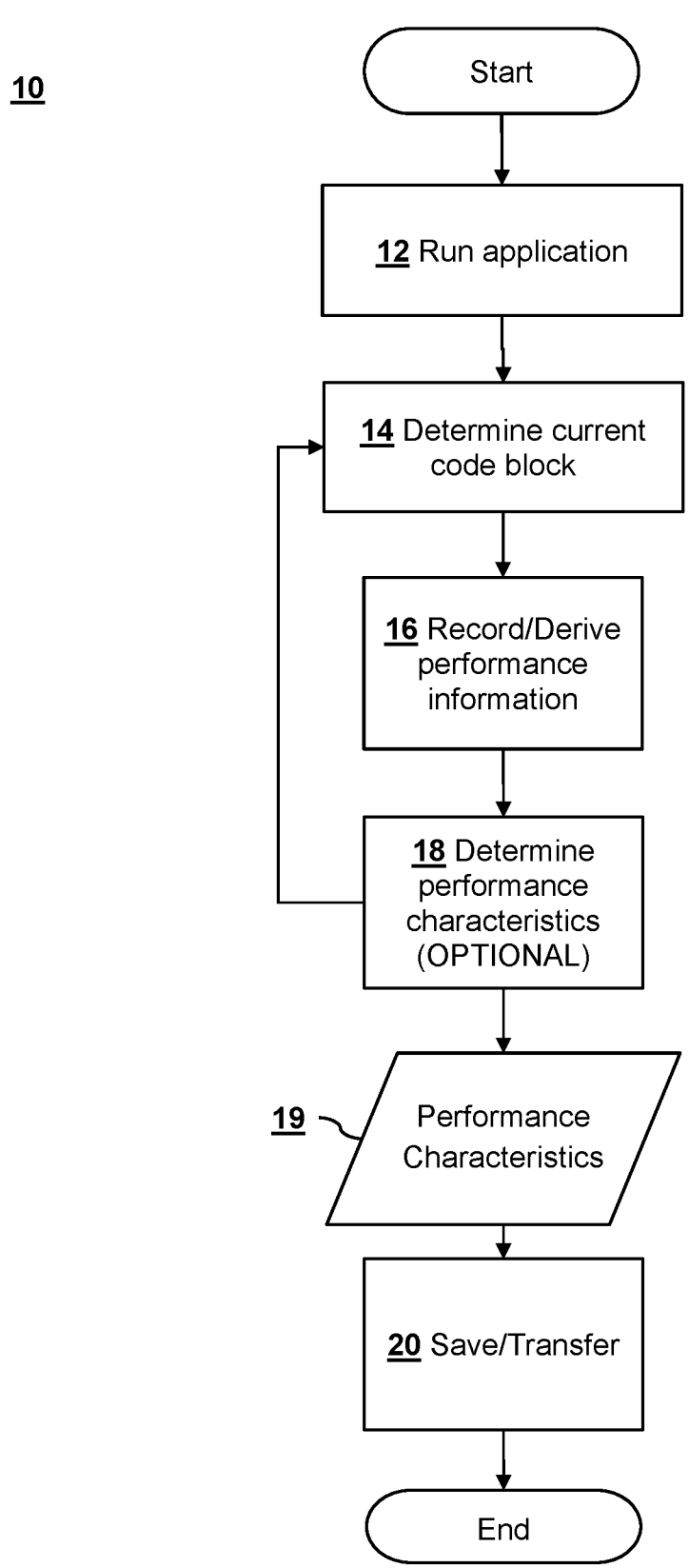
FIG. 1A is a flow diagram that illustrates derivation of application-specific operating parameters in accordance with aspects of the present disclosure.

FIG. 1A shows a method 10 for deriving application-specific operating parameters during a testing phase in which the application runs on the legacy system. The application is run on a legacy system 12 and for each code block 14, performance information is recorded or derived 16. Running the application may include, e.g., loading a capture and letting it run without input or playing through a specific area of a game. Performance information includes Key Performance Metrics and Other Performance Information. Key Performance Metrics refers to that subset of performance information that is most important when the application is run on the new system. A Key Performance Metric is one that must be met when the application is run on the new hardware. Examples of Key Performance Metrics include, but are not limited to frames per second (e.g., in the case of video intensive applications, such as video games) and instructions per cycle (IPC) binned to a program counter (PC) range.

Other Performance Information includes, but is not limited to PC block residence, number of arithmetic logic unit (ALU) instructions issued per unit time (CPU and GPU), number of memory operations issued per unit time (CPU and GPU), average parallel processing hardware scheduling unit (e.g., wavefront, warp, or vector width) occupancy per unit time, average parallel processing hardware scheduling unit lifetime, average latency for memory operations, count of pixels output to render targets per unit time, and total cycles active during a frame (ALU count is a specific example of this).

Performance information may include values that are directly read from counters or derived from such values and other information, such as counting clock cycles between events during program execution. The performance information may be further analyzed at 18 and selected performance information may be combined to determine a set of performance characteristics 19, which may then be saved or transferred 20.

Certain performance information values may be stored in dedicated processor registers that keep track of information related to execution of the application. Examples of such values include, but are not limited to counter values, such as the program counter and counters for memory cycles, arithmetic logic unit (ALU) cycles, and pixels, among others. The program counter (PC), also called the instruction pointer (IP) in Intel x86 and Itanium microprocessors, and sometimes called the instruction address register (IAR), or the instruction counter, is a processor register that indicates where a computer is in its program sequence.

As noted above, certain other performance information, such as average parallel processing hardware scheduling unit (e.g., wavefront, warp, or vector width) occupancy per unit time, average parallel processing hardware scheduling unit lifetime, average latency for memory operations, count of pixels output to render targets per unit time may be derived indirectly. By way of example, and not by way of limitation, the number of instructions per cycle (IPC) may be derived by dividing a difference between initial and final program counter values by a number of clock cycles between the initial and final program counter values. Also, determining the average parallel processing hardware scheduling unit lifetime may involve detecting the launch and completion of such scheduling units and counting clock cycles therebetween. Similarly, determining average occupancy per unit time of parallel processing hardware scheduling units is a matter of recording launch and completion during a given window of time and determining how many, on average, are executing at any given time within that window of time.

The term "parallel processing scheduling unit" is used herein as a generic term to cover several different terms used by manufacturers of different processor hardware to describe the concept of the smallest executable unit for parallel processing of code. For example, in the context of GPUs, parallel processing threads are bunched in what is sometimes called a "warp" (for NVIDIA hardware) or a "wavefront" (for AMD hardware) as the most basic unit of scheduling, the difference primarily being the number of threads that are grouped together. Other equivalent definitions include: "the smallest executable unit code can operate upon" or "unit of processing by a single instruction over all of the threads in it at the same time" or "minimum size of the data processed in SIMD fashion". For CPU hardware the concept of a most basic level of parallelism is often called a "vector width" (for example when using the SSE instructions on Intel and AMD processors). For the sake of simplicity, the term "wavefront" will be used herein as a substitute for "parallel processing scheduling unit". All the threads in a wavefront execute the same instruction in lock-step, the only difference being the data operated on by that instruction.

Other operating information can be derived from operating register values in a number of different ways. For example, IPC may be derived by sampling the counter containing the total number of instructions that have been executed as the program executes. By way of example, this counter may be sampled every N cycles. The IPC value may be derived from an initial total instructions executed value (TIE) and a subsequent value N cycles later ($TIE_{i+N}$) from ($TIE_{i+N}-TIE_i$)/N. As a practical matter, the IPC value for a given section of an application (e.g., block of code) may be binned by the PC range for that particular section. Furthermore, each PC range within an application may therefore have different potential behavior and correspondingly different IPC values. It is therefore useful to associate IPC values with identified sections of program code, e.g., by code block number.

PC block residence, which refers to the block of application code currently being executed, may be more relevant for the CPU than the GPU since the GPU typically runs multiple pieces of code simultaneously. PC block residence may be derived by sampling the PC every N cycles and counting the number of times the sample falls in the same block of code.

Frequency of issuing ALU or Memory Operations may be derived by detecting the issuance of such operations and counting the number of such operations issued over a given window of time. Similarly, the count of pixels output to render targets per unit time may be derived by counting pixels output over a given window of time. Latencies, such as cache latency or memory operation latency may be derived by detecting issuance and completion of cache read/write and/or memory access instructions and counting clock cycles between issuance and completion.

Recording/deriving performance information at 16 may include detecting busy waits. Busy waiting is typically implemented as a short loop. From a counter perspective this will look like the PC is staying in a very small range (and repeating) and there will be some type of memory read or IO read operation that happens every time through the loop. It is possible IPC could be high because of the loop, but more practically IPC will likely be low as the time in the loop will be dominated by waiting for the results of the memory or IO operation to return. Busy waits may be detected by looking for times when the PC stays in a very small range and the time is dominated by waiting for memory or IO operations to complete. The busy waits tend to skew the IPC and other performance information measurements. Since the time spent on busy waits is unpredictable, measurements taken while busy waiting may be removed from the performance information as part of the process of determining the performance characteristics at 18. By doing so, the subsequent process of adjusting the operating parameters won't be influenced by the presence of busy waits.

Analyzing recorded or derived performance information at 18 generally involves narrowing down the performance information to a useful set of performance characteristics 19 that generally characterizes the behavior of the application during execution. The performance characteristics 19 include, but are not limited to one or more key performance metrics and other performance information that is useful for later determination of operating parameters, as discussed below.

The performance characteristic determination stage 18 may determine which performance information values are useful for tuning operating parameters, e.g., by determining correlations between changes in key performance information values and operating parameters through multivariate analysis as many different performance information values may change in response to changes in a given operating parameter.

Parameter Adjustment Process

Figure 1B:
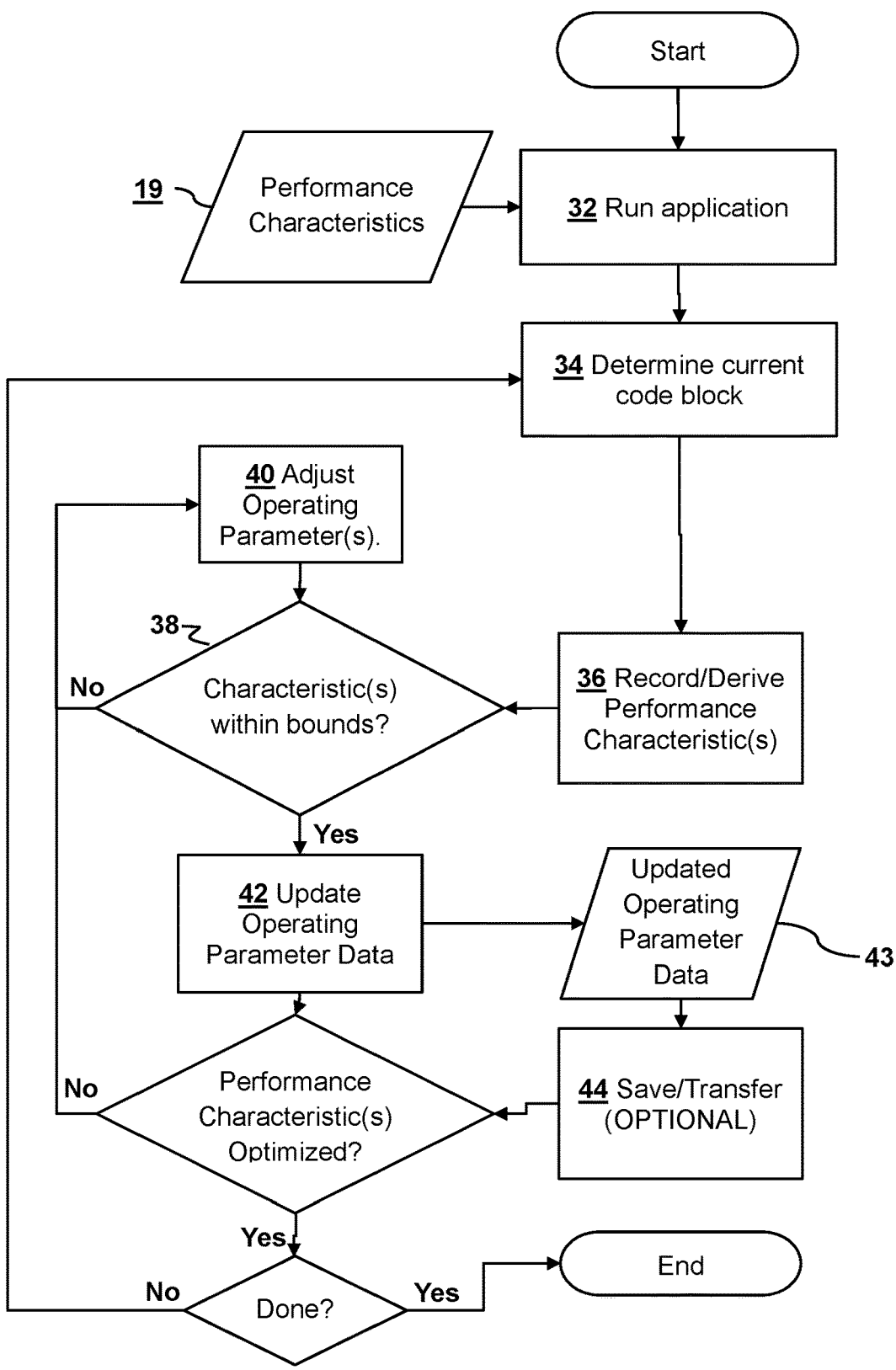
FIG. 1B is a flow diagram that illustrates real-time adjustment of application-specific operating parameters in accordance with aspects of the present disclosure.

FIG. 1B describes a method 30 for adjusting execution of a legacy application to optimize the operating parameters when the application runs on the new system. The new system may use the performance characteristics 19 to adjust one or more operating parameters in real time when running the legacy application (32). For each code block 34 performance information is derived 36, e.g., as discussed above. If one or more key performance metrics are not within bounds at 38, one or more operating parameters may be iteratively adjusted 40 until they are. Once the key performance metrics are within bounds at 38, operating parameters may be updated 42 and optimized by further adjustment 40. Updated/optimized operating parameter data 43 may be saved or transferred 44.

The term "operating parameters" generally refers to aspects of the execution of application on the new system that can be adjusted to affect performance information including key performance metrics. Examples of operating parameters may include, but are not limited to: clock frequencies, e.g., for CPU, GPU, or memory, launch rate of instructions, launch rate of ALU and/or memory operations, resources e.g., general purpose registers (GPRs), wavefront slots, read and store queue sizes, etc., feature disablement, cache parameters (e.g., cache size, number of ways, number of banks, etc.), wavefront launch rate, pixel output rate from render backends, memory operation stalling.

Algorithm matching refers to performing certain operations on the new system using algorithms from the legacy system architecture instead of new and improved algorithms written for the new system architecture. An example of such algorithm matching would be to use the branch predictor for the legacy system to perform branch prediction on the new system. In this example, the algorithm matching parameters would include parameters used in the legacy algorithm.

Other operating parameters may also include parameters related to resource restriction (e.g., as described in U.S. patent application Ser. No. 14/810,361, filed Jul. 27, 2015 and published as U.S. Patent Application Publication Number 20170031834, both of which are incorporated herein by reference, and parameters related to algorithm matching, feature disablement, and matching latency or throughput (e.g., as described in U.S. patent application Ser. No. 14/810, 334, filed Jul. 27, 2015 and published as U.S. Patent Application Publication Number 20170031732, now U.S. Pat. No. 10,235,219 all of which are which is incorporated herein by reference.

Adjustment of operating parameters at 40 can be simple, e.g., setting the number of general purpose registers (GPRs) on the new hardware to the same number as the legacy hardware. Alternatively the new hardware may use a legacy algorithm for certain operations or features of the new hardware may be disabled for operation of the legacy application. The execution may be adjusted to match a latency on the new system to a legacy hardware latency.

Adjustment of operating parameters can be more complex due to architectural differences between the legacy and new hardware. In some cases more resources may be allocated on the new hardware than the original hardware, e.g., by setting a slightly larger number of GPRs.

Table I below lists some non-limiting examples of application-specific operating parameters, how to derive them, and how to adjust them.

TABLE I

| Performance Information | How to Measure/Derive | How to vary by Adjusting Operating Parameter |
| --- | --- | --- |
| Instructions per Cycle (IPC) | Measure all instructions issued with counter during frame (CPU and GPU) | Adjust instruction launch rate (need to do in HW) |
| Frequency of issuing ALU Operations | Measure ALU cycles with counter during frame (CPU and GPU) | Don't allow ALU Operation every N cycles (need to do in HW) |

TABLE I-continued

| Performance Information | How to Measure/Derive | How to vary by Adjusting Operating Parameter |
|---|---|---|
| Frequency of issuing Memory Operations | Measure Memory cycles with counter during frame (CPU and GPU) | Don't allow Memory Operation every N cycles (need to do in HW) |
| Average Wavefront Occupancy per unit time | Can sample this with a counter or replay capture and look at when wavefronts start and stop. (GPU) | Selectively Allocate GPRs (could do in SW) or throttle wavefront launch rate (need to do in HW) |
| Average Wavefront Lifetime | Replay capture and look at when wavefronts start and stop. (GPU) | Selectively Allocate GPRs (could do in SW) or throttle wavefront launch rate (need to do in HW) |
| Pixels output to render targets per unit time | Look at pixel count per unit time w/existing counter. (GPU) | Throttle output rate (# pixels) from render backends (these write pixels out to render targets at the bottom of the graphics pipeline). (need to do in HW) |
| Average Memory operation latency | Determine when a memory instruction is issued and when it's executed and count clock cycles in between (CPU and GPU) | Stall memory operations from finishing (need to do in HW) or run the clock at a different rate (can do in SW). |
| PC block residence | Read Program Counter (CPU) | Useful information when adjusting operating parameters if operating parameter values are strongly correlated to block residence |

The resulting updated operating parameters 43 may include a lower bound for each item of application-specific performance information above where the performance metrics of the legacy application running on the legacy hardware are consistently met. With further testing on the new hardware, each item of application-specific performance information may further include an upper bound, above which the legacy application no longer functions properly or the key performance metrics of the legacy application are no longer met on the new system. The application-specific performance information may correspond to the information in Table II below.

TABLE II

| Code Block | Performance Information | Min | Max |
|---|---|---|---|
| CB1 | Instructions per Cycle (IPC) | $IPC1_{min}$ | $IPC1_{max}$ |
| CB1 | Frequency of issuing ALU Operations | $AOF1_{min}$ | $AOF1_{max}$ |
| CB1 | Frequency of issuing Memory Operations | $MOF1_{min}$ | $MOF1_{max}$ |
| CB1 | Average Wavefront Occupancy per unit time | $AWO1_{min}$ | $AWO1_{max}$ |
| CB1 | Pixels output to render targets per unit time | $PORT1_{min}$ | $PORT1_{max}$ |
| CB1 | Average Memory operation latency | $AML1_{min}$ | $AML1_{max}$ |
| CB1 | PC block residence | $PB1_{min}$ | $PB1_{max}$ |
| CB2 | Instructions per Cycle (IPC) | $IPC2_{min}$ | $IPC2_{max}$ |
| CB2 | Frequency of issuing ALU Operations | $AOF2_{min}$ | $AOF2_{max}$ |
| CB2 | Frequency of issuing Memory Operations | $MOF2_{min}$ | $MOF2_{max}$ |
| CB2 | Average Wavefront Occupancy per unit time | $AWO2_{min}$ | $AWO2_{max}$ |
| CB2 | Pixels output to render targets per unit time | $PORT2_{min}$ | $PORT2_{max}$ |
| CB2 | Average Memory operation latency | $AML2_{min}$ | $AML2_{max}$ |
| CB2 | PC block residence | $PB2_{min}$ | $PB2_{max}$ |

In the example shown in Table II, there is a set of upper and lower bounds for performance information for each code block in a legacy program. This information may be used in subsequent operation of the legacy game on the new hardware. Such subsequent operation may proceed as described in FIG. 1B with the new hardware adjusting execution to keep the performance information between the minimum and maximum values.

Figure 2A:
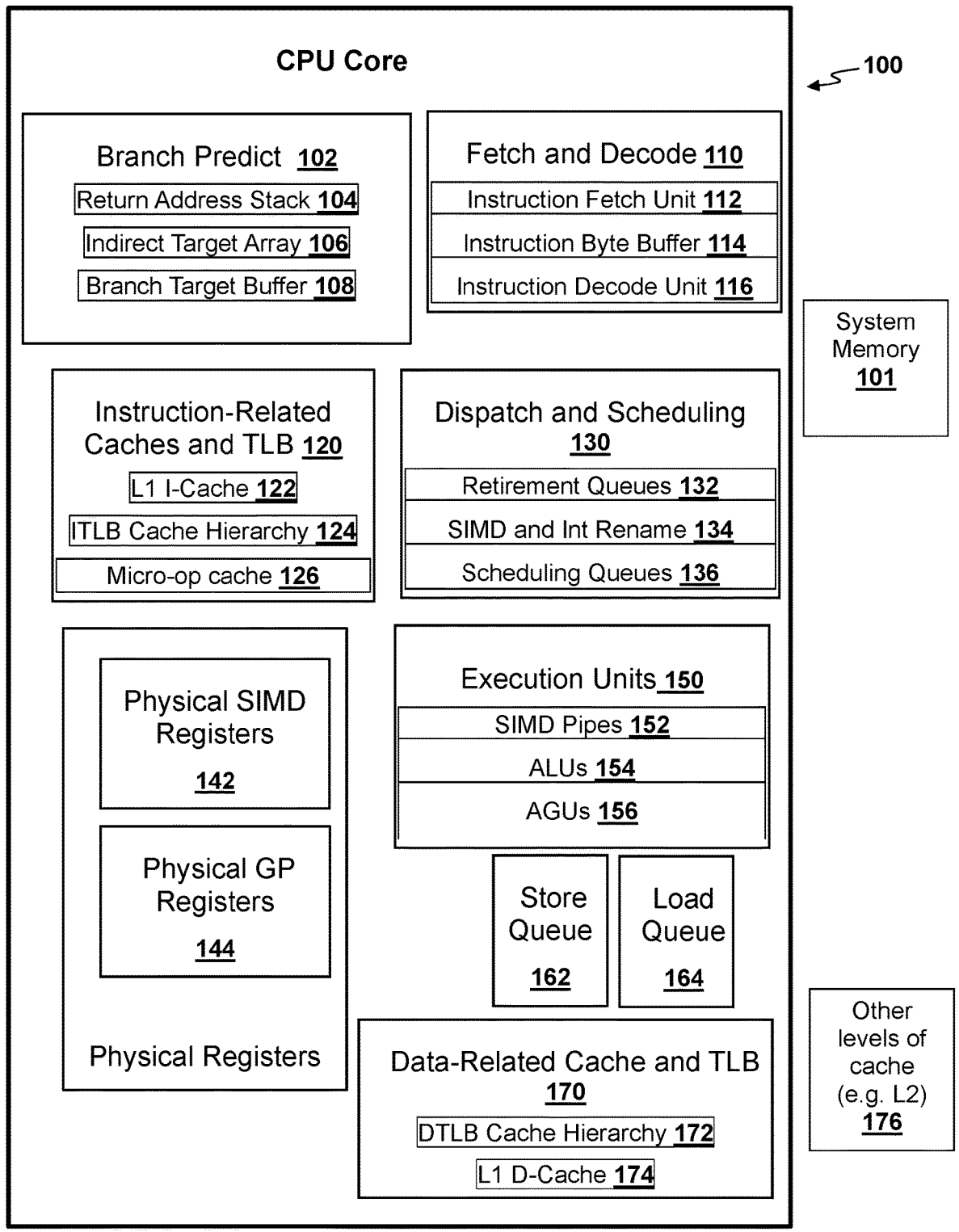
FIG. 2A is a block diagram illustrating an example of a central processing unit (CPU) core that may be configured to operate in a backwards compatibility mode in accordance with aspects of the present disclosure.
Figure 2B:
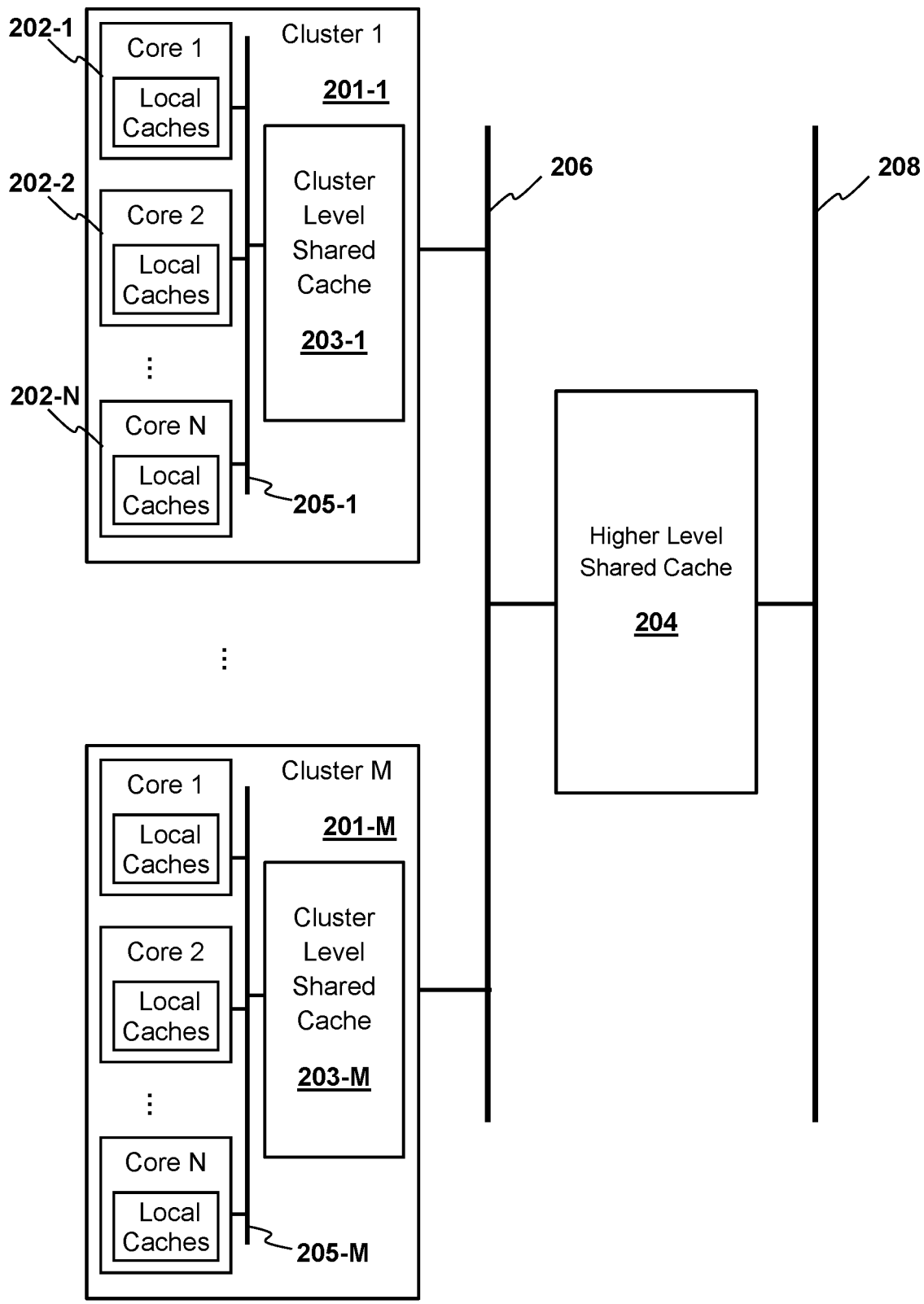
FIG. 2B is a block diagram illustrating an example of a possible multi-core architecture for a CPU in accordance with aspects of the present disclosure.
Figure 3:
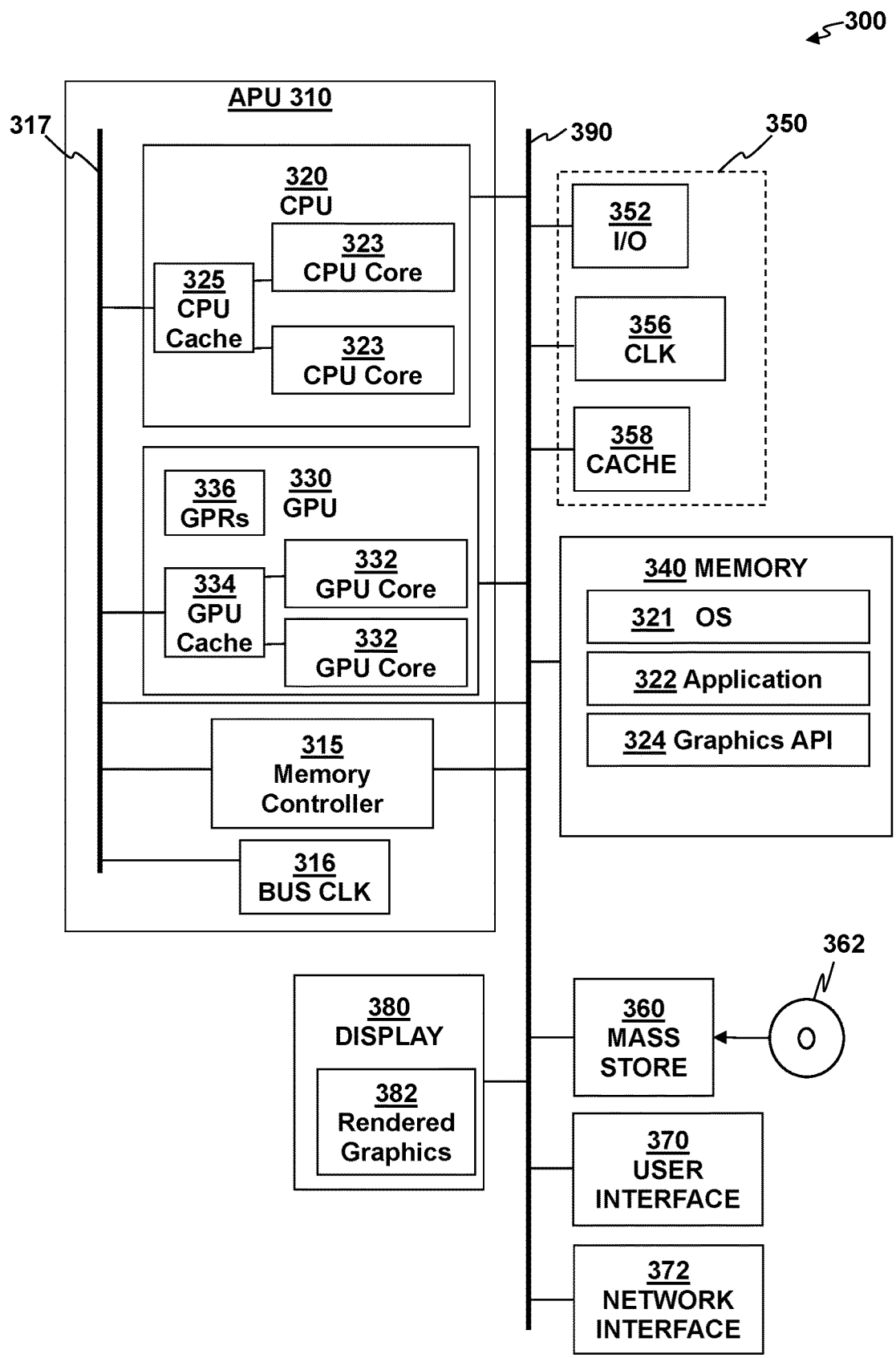
FIG. 3 is a block diagram of a device having a CPU configured to operate in a backwards compatibility mode in accordance with aspects of the present disclosure.

Operating parameter derivation and adjustment may be related to features of hardware shown in FIGS. 2A-2B and FIG. 3. FIG. 2A depicts a generalized architecture of a CPU core 100. The CPU core 100 typically includes a branch prediction unit 102, that attempts to predict whether a branch will be taken or not, and also attempts (in the event that the branch is taken) to predict the destination address of the branch. To the extent that these predictions are correct the efficiency of speculatively executed code will be increased; highly accurate branch prediction is therefore extremely desirable. The branch prediction unit 102 may include highly specialized sub-units such as a return address stack 104 that tracks return addresses from subroutines, an indirect target array 106 that tracks the destinations of indirect branches, and a branch target buffer 108 and its associated prediction logic that track past history of branches in order to more accurately predict their resulting addresses.

The CPU core 100 typically includes an instruction fetch and decode unit 110, which includes an instruction fetch unit 112, an instruction byte buffer 114, and an instruction decode unit 116. The CPU core 100 also typically includes a number of instruction related caches and instruction translation lookaside buffers (ITLBs) 120. These may include an ITLB cache hierarchy 124 that caches virtual address to physical address translation information such as page table entries, page directory entries, and the like. This information is used to transform the virtual address of the instruction into a physical address so that the instruction fetch unit 112 can load the instructions from the cache hierarchy. By way of example, and not by way of limitation, the program instructions may be cached according to a cache hierarchy that includes a level 1 instruction cache (L1 I-Cache) 122 residing in the core, as well as other cache levels 176 external to the CPU core 100; using the physical address of the instruction, these caches are first searched for the program instructions. If the instructions are not found, then they are loaded from a system memory 101. Depending on the architecture, there may also be a micro-op cache 126 that contains the decoded instructions, as described below.

Once the program instructions have been fetched, they are typically placed in the instruction byte buffer 114 awaiting processing by the instruction fetch and decode unit 110. Decoding can be a very complex process; it is difficult to decode multiple instructions each cycle, and there may be restrictions on instruction alignment or type of instruction that limit how many instructions may be decoded in a cycle. Decoded instructions may, depending on architecture, be placed in the micro-op cache 126 (if one is present on the new CPU) so that the decode stage can be bypassed for subsequent use of the program instructions.

Decoded instructions are typically passed to other units for dispatch and scheduling 130. These units may use retirement queues 132 to track the status of the instructions throughout the remainder of the CPU pipeline. Also, due to the limited number of general purpose and SIMD registers available on many CPU architectures, register renaming may be performed, in which as logical (also known as architectural) registers are encountered in stream of instructions being executed, physical registers 140 are assigned to represent them. The physical registers 140 may include Single Instruction Multiple Data (SIMD) register banks 142 and General Purpose (GP) register banks 144, which can be much larger in size than the number of logical registers available on the particular CPU architecture, and as a result the performance can be considerably increased. After register renaming 134 is performed, instructions are typically placed in scheduling queues 136, from which a number of instructions may be selected each cycle (based on dependencies) for execution by execution units 150.

The execution units 150 typically include SIMD pipes 152 that perform a number of parallel operations on multiple data fields contained in 128-bit or wider SIMD registers contained in the SIMD register bank 142, arithmetic and logic units (ALUs) 154 that perform a number of logical, arithmetic, and miscellaneous operations on GPRs contained in the GP register bank 144, and address generation units (AGUs) 156 that calculate the address from which memory should be stored or loaded. There may be multiple instances of each type of execution unit, and the instances may have differing capabilities, for example a specific SIMD pipe 152 may be able to perform floating point multiply operations but not floating point add operations.

Stores and loads are typically buffered in a store queue 162 and a load queue 164 so that many memory operations can be performed in parallel. To assist in memory operations, the CPU core 100 usually includes a number of data related caches and data translation lookaside buffers (DTLBs) 170. A DTLB cache hierarchy 172 caches virtual address to physical address translation such as page table entries, page directory entries, and the like; this information is used to transform the virtual address of the memory operation into a physical address so that data can be stored or loaded from system memory. The data is typically cached in a level 1 data cache (L1 D-Cache) 174 residing in the core, as well as other cache levels 176 external to the core 100.

According to certain aspects of the disclosure, a CPU may include a plurality of cores. By way of example and not by way of limitation, FIG. 2B depicts an example of a possible multi-core CPU 200 that may be used in conjunction with aspects of the present disclosure. Specifically, the architecture of the CPU 200 may include M clusters 201-1 . . . 201-M, where M is an integer greater than zero. Each cluster may have N cores 202-1, 202-2 . . . 202-N, where N is an integer greater than 1. Aspects of the present disclosure include implementations in which different clusters have different numbers of cores. Each core may include one or more corresponding dedicated local caches (e.g., L1 instruction, L1 data, or L2 caches). Each of the local caches may be dedicated to a particular corresponding core in the sense that it is not shared with any other cores. Each cluster may also include a cluster-level cache 203-1 . . . 203-M that may be shared between the cores in the corresponding cluster. In some implementations the cluster-level caches are not shared by cores associated with different caches. Furthermore, the CPU 200 may include one or more higher-level caches 204, which may be shared between the clusters. To facilitate communication among the cores in a cluster, the clusters 201-1 . . . 202-M may include corresponding local busses 205-1 . . . 205-M coupled to each of the cores and the cluster-level cache for the cluster. Likewise, to facilitate communication among the clusters, the CPU 200 may include one or more higher-level busses 206 coupled to the clusters 201-1 . . . 201-M and to the higher level cache 204. In some implementations the higher-level bus or busses 206 may also be coupled to other devices, e.g., a GPU, memory, or memory controller. In still other implementations, the higher-level bus or busses 206 may be connected to a device-level bus that connects to different devices within a system. In yet other implementations, the higher level bus or busses 206 may couple the clusters 201-1 . . . 201-M to the higher level cache 204, and a device-level bus 208 may couple the higher level cache 204 to other devices, e.g., a GPU, memory, or memory controller. By way of example, and not by way of limitation, an implementation with such a device-level bus 208 may arise, e.g., where the higher level cache 204 is an L3 for all CPU cores, but not for GPU use.

In the CPU 200 OS processing may occur predominantly on a certain core, or a certain subset of the cores. Similarly, application-level processing may occur predominantly on a particular core or subset of the cores. Individual application threads may be designated by the application to run on a certain core, or a certain subset of the cores. As caches and buses are shared, speed of processing by a given application thread may vary depending on the processing occurring by other threads (e.g., application threads or OS threads) running in the same cluster as the given application thread. Depending on the specifics of the CPU 200, a core may be capable of executing only one thread at once, or may be capable of executing multiple threads simultaneously ("hyperthreading"). In the case of a hyperthreaded CPU, an application may also designate which threads may be executed simultaneously with which other threads. Performance of a thread is impacted by the specific processing performed by any other threads being executed by the same core.

Turning now to FIG. 3, an illustrative example of a device 300 configured to operate in accordance with aspects of the present disclosure is depicted. According to aspects of the present disclosure, the device 300 may be an embedded system, mobile phone, personal computer, tablet computer, portable game device, workstation, game console, and the like.

The device 300 generally includes a central processor unit (CPU) 320 which may include one or more CPU cores 323 of the type depicted in FIG. 1 and discussed above. The CPU 320 may include a plurality of such cores 323 and one or more caches 325 in a configuration like that shown in the CPU 200 of FIG. 2. By way of example and not by way of limitation, the CPU 320 may be part of an accelerated processing unit (APU) 310 that includes the CPU 320, and a graphics processing unit (GPU) 330 on a single chip. In alternative implementations, the CPU 320 and GPU 330 may be implemented as separate hardware components on separate chips. The GPU 330 may also include two or more cores 332 and two or more caches 334 and (in some implementations) one or more busses to facilitate communication among the cores and caches and other components of the system. The busses may include an internal bus or busses 317 for the APU 310, and an external data bus 390.

The device 300 may also include memory 340. The memory 340 may optionally include a main memory unit that is accessible to the CPU 320 and GPU 330. The CPU 320 and GPU 330 may each include one or more processor cores, e.g., a single core, two cores, four cores, eight cores, or more. The CPU 320 and GPU 330 may be configured to access one or more memory units using the external data bus 390, and, in some implementations, it may be useful for the device 300 to include two or more different buses.

The memory 340 may include one or more memory units in the form of integrated circuits that provides addressable memory, e.g., RAM, DRAM, and the like. The memory may contain executable instructions configured to implement a method like the method of FIG. 5 upon execution for determining operate the device 300 in a timing testing mode when running applications originally created for execution on a legacy CPU. In addition, the memory 340 may include a dedicated graphics memory for temporarily storing graphics resources, graphics buffers, and other graphics data for a graphics rendering pipeline.

The CPU 320 may be configured to execute CPU code, which may include operating system (OS) 321 or an application 322 (e.g., a video game). The operating system may include a kernel that manages input/output (I/O) requests from software (e.g., application 322) and translates them into data processing instructions for the CPU 320, GPU 330 or other components of the device 300. The OS 321 may also include firmware, which may be stored in non-volatile memory. The OS 321 may be configured to implement certain features of operating the CPU 320 in a timing testing mode, as discussed in detail below. The CPU code may include a graphics application programming interface (API) 324 for issuing draw commands or draw calls to programs implemented by the GPU 330 based on a state of the application 322. The CPU code may also implement physics simulations and other functions. Portions of the code for one or more of the OS 321, application 322, or API 324 may be stored in the memory 340, caches internal or external to the CPU or in a mass storage device accessible to the CPU 320.

The device 300 may include a memory controller 315. The memory controller 315 may be a digital circuit that manages the flow of data going to and from the memory 340. By way of example and not by way of limitation, the memory controller may be an integral part of the APU 310, as in the example depicted in FIG. 3, or may be a separate hardware component.

The device 300 may also include well-known support functions 350, which may communicate with other components of the system, e.g., via the bus 390. Such support functions may include, but are not limited to, input/output (I/O) elements 352, one or more clocks 356, which may include separate clocks for the CPU 320, GPU 330, and memory 340, respectively, and one or more levels of cache 358, which may be external to the CPU 320 and GPU 330. The device 300 may optionally include a mass storage device 360 such as a disk drive, CD-ROM drive, flash memory, tape drive, Blu-ray drive, or the like to store programs and/or data. In one example, the mass storage device 360 may receive a computer readable medium 362 containing a legacy application originally designed to run on a system having a legacy CPU. Alternatively, the legacy application 362 (or portions thereof) may be stored in memory 340 or partly in the cache 358.

The device 300 may also include a display unit 380 to present rendered graphics 382 prepared by the GPU 330 to a user. The device 300 may also include a user interface unit 370 to facilitate interaction between the system 100 and a user. The display unit 380 may be in the form of a flat panel display, cathode ray tube (CRT) screen, touch screen, head mounted display (HMD) or other device that can display text, numerals, graphical symbols, or images. The display 380 may display rendered graphics 382 processed in accordance with various techniques described herein. The user interface 370 may contain one or more peripherals, such as a keyboard, mouse, joystick, light pen, game controller, touch screen, and/or other device that may be used in conjunction with a graphical user interface (GUI). In certain implementations, the state of the application 322 and the underlying content of the graphics may be determined at least in part by user input through the user interface 370, e.g., where the application 322 includes a video game or other graphics intensive application.

The device 300 may also include a network interface 372 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

Table III below lists some non-limiting examples of how specific hardware elements described above with respect to FIG. 2A, FIG. 2B, and FIG. 3 may be used to determine performance information and corresponding operating parameters to adjust.

TABLE III

| Performance Information | How to Record/Derive | Operating Parameter to Adjust |
|---|---|---|
| Instructions per Cycle (IPC) | Read counter of instructions executed (FIG. 2A, part of Retirement Queues 132) | Adjust instruction launch rate (FIG. 2A, part of Scheduling Queues 136 for CPU and FIG. 3, part of GPU Core 332 for GPU) |
| Frequency of issuing ALU Operations | Read ALU counters (FIG. 2A, part of ALUs 154 and SIMD Pipes 152 for CPU and FIG. 3, part of the GPU Core 332 for GPU) | Don't allow ALU Operation every N cycles (FIG. 2A, part of Scheduling Queues 136 for CPU and FIG. 3, part of GPU Core 332 for GPU) |
| Frequency of issuing Memory Operations | Read memory operation counter(s) (FIG. 2A, part of AGUs 156 for CPU and FIG. 3, part of GPU Core 332 for GPU) | Don't allow Memory Operation every N cycles (FIG. 2A, part of Scheduling Queues 136 for CPU and FIG. 3, part of GPU Core 332 for GPU) |
| Average Wavefront Occupancy per unit time | Record wavefront start and completion events generated by GPU core (FIG. 3, part of GPU Core 332) | Selectively Allocate GPRs (FIG. 3, GPRs 336) or Throttle wavefront launch rate (FIG. 3, part of GPU Core 332) |
| Average Wavefront Lifetime | Record wavefront start and completion events generated by GPU core (FIG. 3, part of GPU Core 332) or read wavefront lifetime counters core (FIG. 3, part of GPU Core 332) | Selectively Allocate GPRs (FIG. 3, GPRs 336) or Throttle wavefront launch rate (FIG. 3, part of GPU Core 332) |
| Pixels output to render targets per unit time | Read pixel counters (FIG. 3, part of GPU Core 332) | Throttle output rate (# pixels) from render backends (FIG. 3, part of GPU Core 332) |
| Average Memory operation latency | Track length of outstanding memory operations (FIG. 2A, part of Store Queue 162 and Load Queue 164 for CPU and FIG. 3, part of GPU Core 332 for GPU) | Stall memory operations from finishing (FIG. 2A, part of Store Queue 162 and Load Queue 164 for CPU and FIG. 3, part of GPU Core 332 for GPU) or run the clock at a different rate (FIG. 3, CLK 356) |
| Branch Predict hits and misses | Read counters of branch prediction hits and misses (FIG. 2A, part of Branch Predict 102) | Match legacy branch prediction algorithm (FIG. 2A, part of Branch Predict 102) or run the clock at a different rate (FIG. 3, CLK 356) |
| PC block residence | Read Program Counter (FIG. 2A, part of Fetch and Decode Unit 110) | No operating parameters to directly adjust, but useful information if operating parameter values are strongly correlated to block residence |

Note that it may not be possible for performance information recorded or derived when running the legacy application on the new device to meet or exceed corresponding performance information for running the legacy application on the legacy device. For example, average memory latency on a new device may be higher than the average memory latency measured on the legacy device, regardless of how the operating parameters are adjusted. Knowing this type of performance information for the new system may be useful when adjusting the operating parameters, but shouldn't be used when comparing the performance characteristics of an application running on a legacy and new device. Only key performance metrics like, but not limited to, frames per second (FPS) and instructions per cycle (IPC) should actually be used.

The process of adjusting the operating parameters when the application runs on a new device in order to meet the key performance metrics of the same application run on a legacy device may be understood from the following example involving video games. First, performance data is collected for a game running on the legacy device in order to determine its key performance metrics. Next the game is run on the new device while adjusting the operating parameters of the new device. Performance of the new device can be measured by collecting the same performance information on the new device as was done when the game ran on the legacy device and then comparing the key performance metrics of the game running on those two devices. While it may be desirable for the performance information for the new device to perfectly match the performance data from the legacy device, this may not be practically possible. It is sufficient for the performance information on the new device to match the performance information on the legacy device as closely as possible. However, it is unacceptable for key performance metrics on the new device to be worse than key performance metrics on the legacy device, as is an application or game that crashes (typically due to synchronization problems), or produces incorrect outputs (for the same reasons).

Now practically speaking, the first several times games are run on a new device the operating parameters will likely be set to be the same as on the legacy device. Once enough games have been run on the new device and their operating parameters have been tuned, that experience and data can be used to build a heuristic that can be used for additional games. The heuristic can be used to set the initial values of the operating parameters on the new device based upon the performance characteristics of the game. The game would then be run on the new device and the operating parameters may be modified to better match the key performance metrics. All performance data as measured on the new device can be used to help adjust the operating parameters, not just the key performance metrics. Any adjustments made to the operating parameters can also be used to further refine the heuristic.

What is claimed is:

1. A method for running a legacy application on a non-legacy device, comprising: setting operating parameters of the non-legacy device when running the legacy application based on one or more pre-determined heuristics for adjustment of operating parameters of the non-legacy device when running the legacy application on the non-legacy device from one or more performance metrics and other performance information.

2. The method of claim 1, wherein the one or more pre-determined heuristics use one or more performance metrics determined from counting clock cycles between events during program execution.

3. The method of claim 1, wherein the one or more pre-determined heuristics use one or more performance metrics determined from values stored in one or more dedicated processor registers that keep track of information related to execution of the legacy application.

4. The method of claim 3, wherein the values stored in the one or more dedicated processor registers includes a counter value.

5. The method of claim 4, wherein the counter value is a program counter value.

6. The method of claim 4, wherein the counter value is a value of a counter for memory cycles, arithmetic logic unit (ALU) cycles, or pixels.

7. The method of claim 1, wherein the one or more pre-determined heuristics use one or more performance metrics are determined from detected busy waits.

8. The method of claim 1, wherein the one or more pre-determined heuristics use one or more key performance metrics include to frames per second.

9. The method of claim 1, wherein the one or more pre-determined heuristics use one or more key performance metrics include instructions per cycle (IPC) binned to a program counter (PC) range.

10. The method of claim 1, wherein the other performance information is derived indirectly.

11. The method of claim 9, wherein the other performance information includes an average parallel processing hardware scheduling unit occupancy per unit time, an average parallel processing hardware scheduling unit lifetime, an average latency for memory operations, or a count of pixels output to render targets per unit time.

12. The method of claim 1, further comprising determining one or more performance information values that are useful for tuning operating parameters of the system.

13. The method of claim 12, wherein determining the one or more performance information values that are useful for tuning operating parameters of the system includes determining one or more correlations between changes in key performance information values and operating parameters.

14. The method of claim 12, wherein determining one or more performance information values that are useful for tuning operating parameters of the system includes determining one or more correlations between changes in key performance information values and operating parameters through multivariate analysis.

15. The method of claim 1, wherein the non-legacy device is a video game system.

16. A system, comprising:
a processor; and a memory;
storing processor executable instructions, the processor executable instructions being configured to implement a method for running a legacy application on a non-legacy device, the method comprising:
setting one or more operating parameters of the non-legacy device when running the legacy application based on one or more pre-determined heuristics for adjustment of operating parameters of the non-legacy device when running the legacy application on the non-legacy device from one or more performance metrics and other performance information.

17. A non-transitory computer readable medium having computer readable instructions embodied therein, the computer readable instructions being configured to implement a method for running a legacy application on a non-legacy device, the method comprising:
setting operating parameters of the non-legacy device based on one or more pre-determined heuristics for adjustment of operating parameters of the non-legacy device when running the legacy application on the non-legacy device from one or more performance metrics and other information.

18. The system of claim 16, wherein the one or more pre-determined heuristics use one or more performance metrics determined from counting clock cycles between events during program execution.

19. The system of claim 16, wherein the one or more pre-determined heuristics use one or more performance metrics determined from values stored in one or more dedicated processor registers that keep track of information related to execution of the legacy application.

20. The non-transitory computer readable medium of claim 17, wherein the one or more pre-determined heuristics use one or more performance metrics are determined from detected busy waits.

* * * * *